United States Patent [19]
Clark

[11] 3,770,150
[45] Nov. 6, 1973

[54] WORK CARRIER LIFT AND TRANSFER MECHANISM

[75] Inventor: Chester G. Clark, Grosse Pointe Woods, Mich.

[73] Assignee: Oxy Metal Finishing Corporation, Warren, Mich.

[22] Filed: Dec. 8, 1971

[21] Appl. No.: 205,987

[52] U.S. Cl..................................... 214/89, 198/19
[51] Int. Cl..... B66b 17/00, B23q 7/00, B65g 35/00
[58] Field of Search........................... 198/19; 214/89

[56] References Cited
UNITED STATES PATENTS

| | | | |
|---|---|---|---|
| 3,504,812 | 4/1970 | Clark ................................ | 198/19 X |
| 3,311,214 | 3/1967 | Davis et al. ............................ | 198/19 |
| 2,602,558 | 7/1952 | Clark .................................... | 214/89 |

*Primary Examiner*—Evon C. Blunk
*Assistant Examiner*—James W. Miller
*Attorney*—Harness, Dickey & Pierce

[57] ABSTRACT

A work carrier lift and transfer mechanism for a conveying machine of the type having a plurality of interconnected work carriers movably mounted on a framework including guide means thereon extending longitudinally of a series of treating stations. Each work carrier includes a carriage frame on which a carriage is mounted having a work supporting member thereon for movement between a lowered position and a raised position in response to the ascending and descending movement of an elevator chassis incorporating a lift member thereon adapted to engage a supporting member on the carriage at selected ones of the several treating stations to enable a transfer of the workpieces above the partitions separating adjoining treating stations. The elevator chassis incorporates a reciprocable transfer mechanism including at least one transfer member engageable with an engaging member on the carriage frames for effecting an intermittent advancement of the work carriers when the chassis is in the elevated position from one station to the next adjoining treating station. The transfer members are arranged at substantially uniform intervals in order that the transfer force applied to the carriage frames is distributed substantially uniformly along a chain interconnecting the work carriers.

11 Claims, 11 Drawing Figures

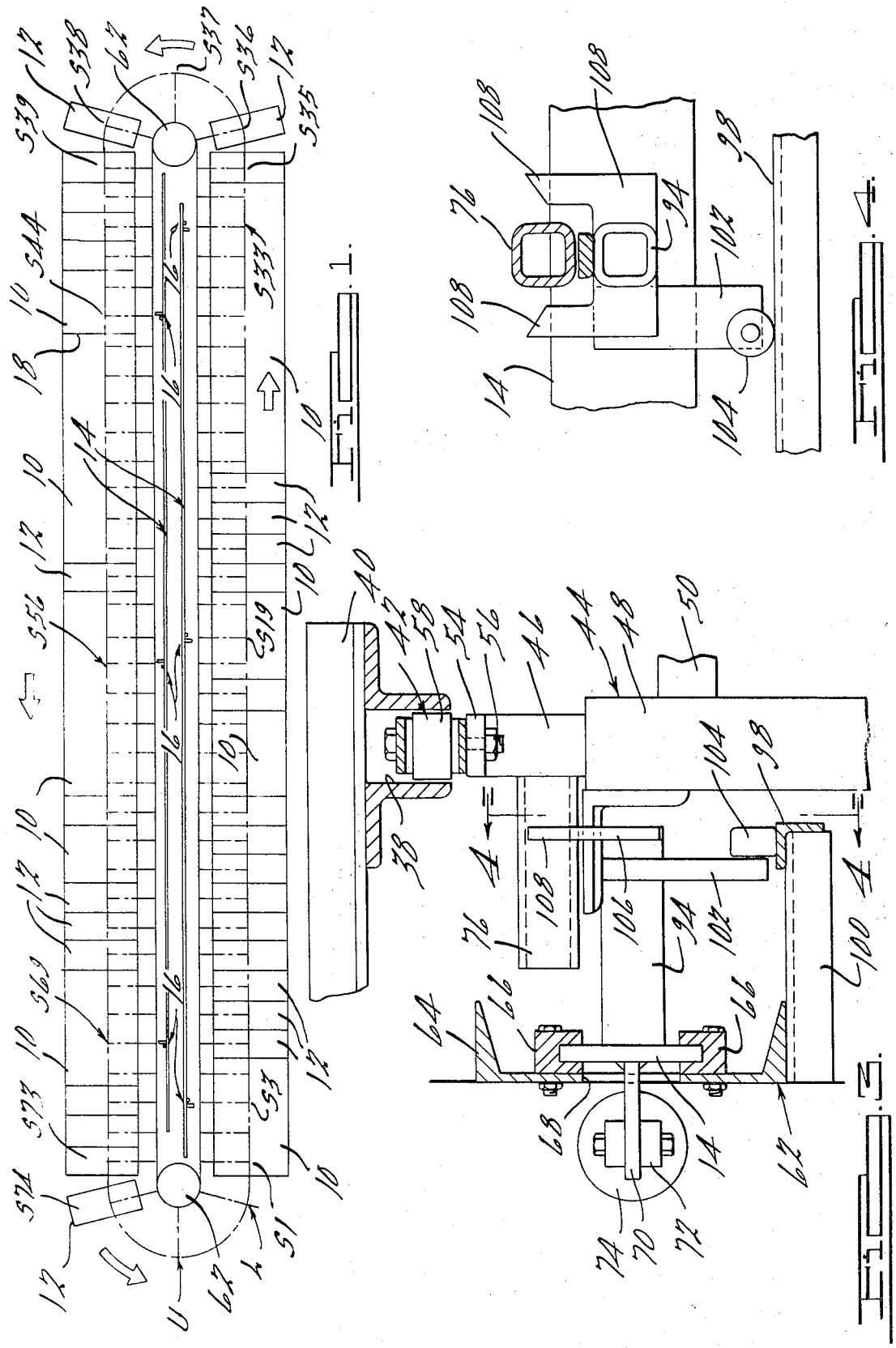

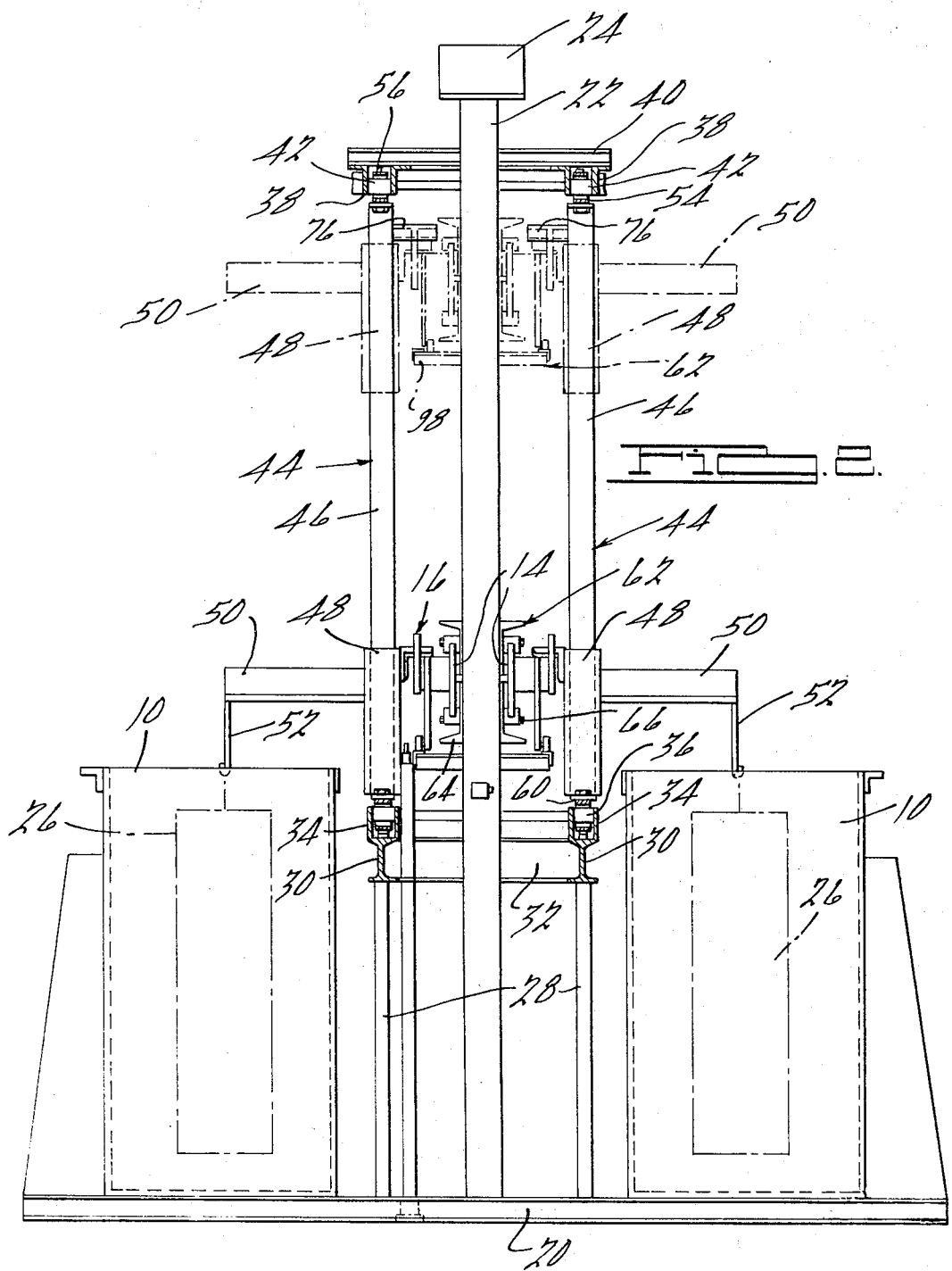

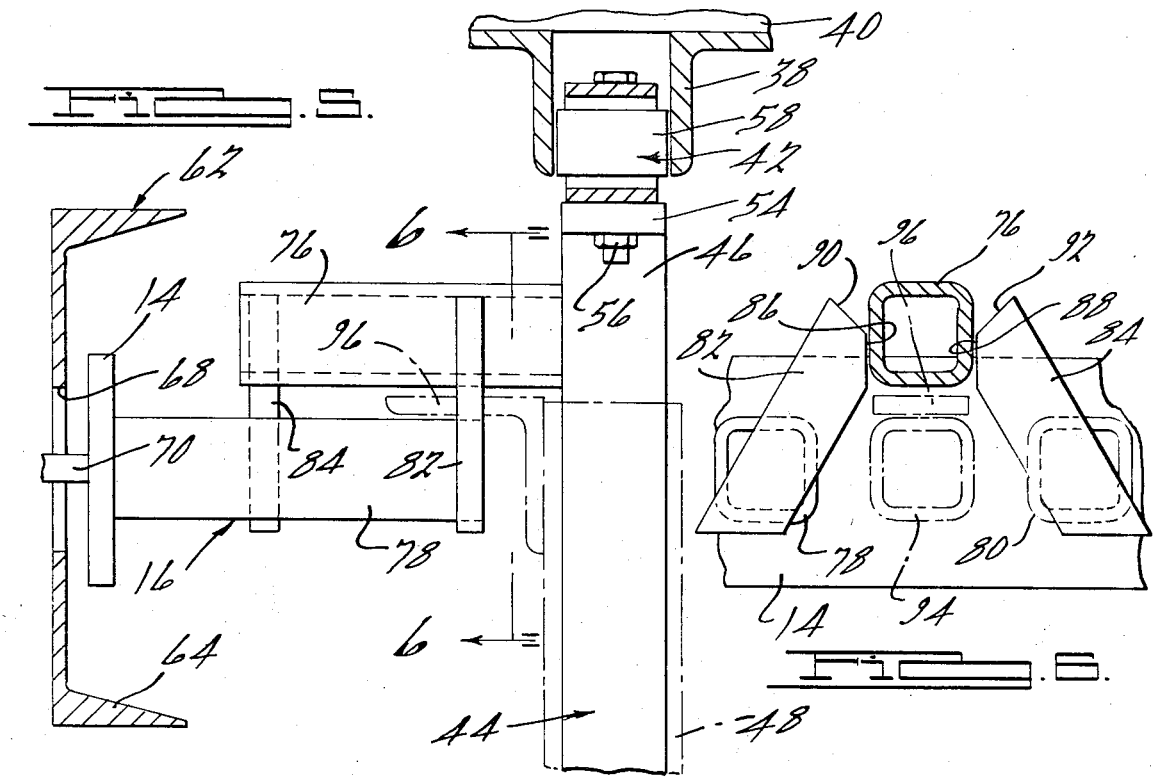

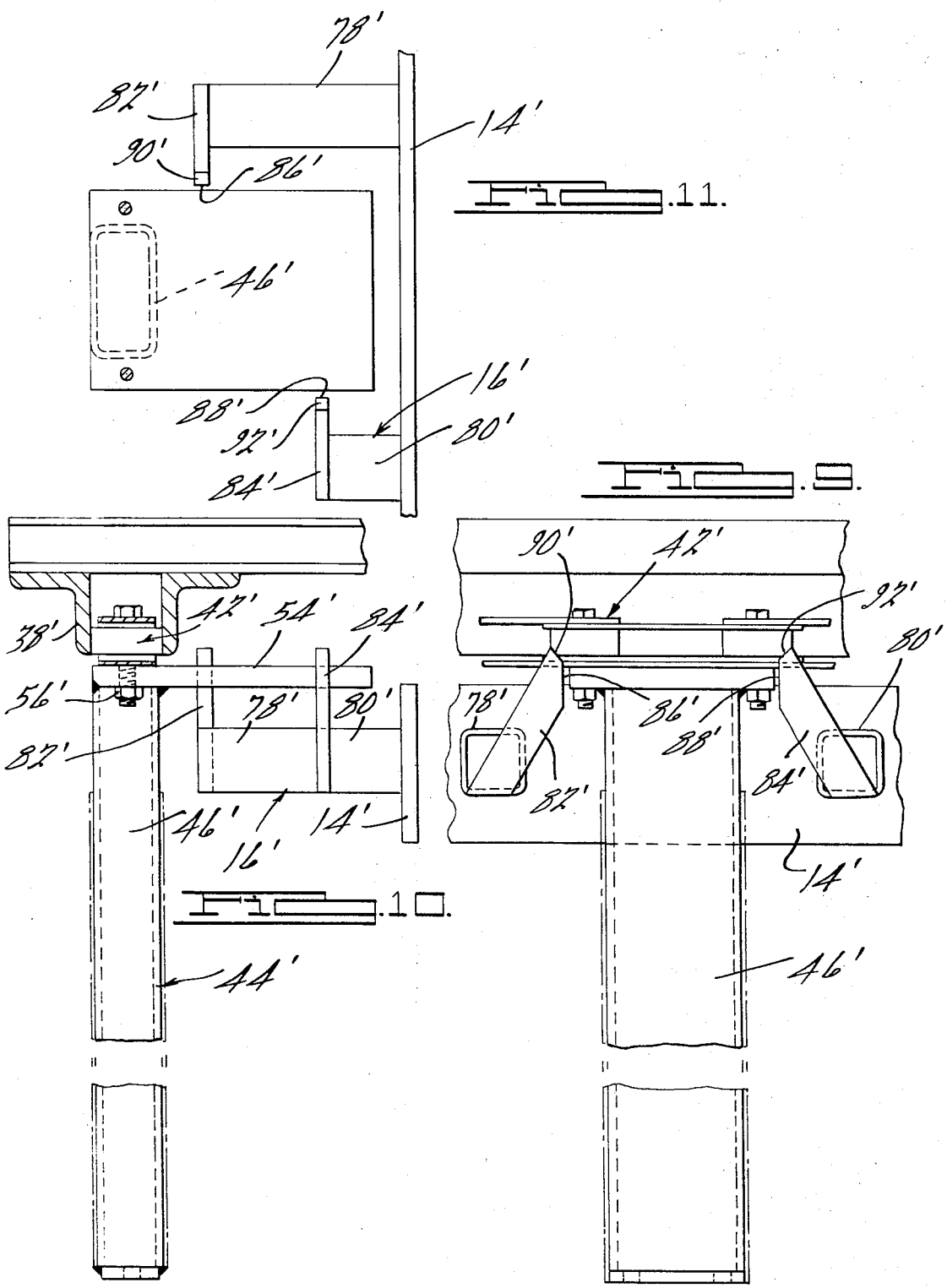

WORK CARRIER LIFT AND TRANSFER MECHANISM

BACKGROUND OF THE INVENTION

A conveying machine of the general type to which the present invention is applicable is disclosed and described in U.S. Pat. No. 3,504,812, granted Apr. 7, 1970, for "Conveying Machine", which is assigned to the same assignee as is the present invention. Conveying machines of this general type are in widespread commercial use for transporting workpieces through a sequentially phased process cycle such as encountered in chemical, electrochemical, electroplating or the like proceses. The machines conventionally include a plurality of interconnected work carriers which are movably mounted on guides affixed to the central machine framework and which extend in a closed loop pattern comprising two straight side sections interconnected at their ends by arcuate turnaround sections. Each work carrier includes a work supporting arm which extends laterally of the path of travel of the work carriers from which workpieces or suitable work racks for the workpieces are suspended and are adapted to be sequentially raised and lowered as they are intermittently advanced from a load station through the several work stations to an unload station at the end of the processing cycle.

A lifting and a lowering of the work supporting arms and workpieces thereon is conveniently achieved by an elevator chassis mounted for up and down movement on the central machine framework which includes lifting pads adapted to engage carriages mounted on an upright carriage frame of each work carrier to effect movement thereof to and from a raised position and a lowered position. A transfer of the work carriers from one station to the next adjoining station is achieved by a transfer mechanism which is longitudinally reciprocable and is mounted on the elevator chassis and movable from a retracted position to an advanced position when the elevator chassis is in the raised position.

In conveying machines of the foregoing type heretofore known, engagement of the transfer mechanism only occurred with those work carriers whose carriages were in the raised position and supported by the elevator chassis. The remaining work carriers having their carriages in the lowered position were advanced in response to the transfer force applied through the roller chain or flexible element interconnecting the work carriers. Inasmuch as it is ordinarily necessary to lift and lower work supporting arms more frequently in the pretreatment and post-treatment sections of processes, such as an electroplating operation, for example, the transfer force is applied nonuniformly along the length of the flexible element or chain interconnecting the work carriers, thereby occasioning undue stresses and loading thereon which is conducive to an accelerated wear of the operating components. In addition, the uneven application of transfer force results in an excessive tensioning of some sections of the interconnecting chain and a slackening of other sections which, in aggravated situations, can cause a misalignment of the work carriers and the work supporting arms at some work stations.

Prior art type transfer devices are also characterized as imposing torque forces on the work carrier carriage frames during the transfer stroke, tending to effect a twisting thereof which, in combination with excessive slack in some sections of the interconnecting chain, in some instances imposes an objectionable jarring of the workpieces and work racks on the work supporting arms.

The lift and transfer mechanism of the present invention overcomes the problems and disadvantages of prior art type mechanisms by applying a substantially uniform transfer force to the work carriers which is substantially uniformly distributed along the interconnecting chain and which transfer mechanism furthermore eliminates the imposition of off-center transfer forces and a twisting of the work carrier frames during the transfer movement.

SUMMARY OF THE INVENTION

The benefits and advantages of the present invention are achieved by a conveying machine comprising a framework having guide means thereon for supporting a plurality of work carriers interconnected by a substantially inextensible chain or other flexible element so as to maintain the work carriers in a substantially fixed longitudinal spacing corresponding to the distance between the work stations. Each work carrier is comprised of a substantially upright carriage frame movably mounted on the guide means and on which a carriage having a work supporting member or arm thereon is guidably mounted for up and down movement between a raised position and a lowered position. Each carriage is provided with a supporting member which is adapted to be engaged by a lift member on an elevator chassis mounted on the central machine framework for movement between the raised and lowered positions. A transfer mechanism is mounted on the elevator chassis and incorporates a transfer member thereon engageable with an engaging member affixed to the upper portion of the carriage frame of each work carrier for effecting an advancement of the work carriers in response to the advancing stroke of the transfer mechanism when the elevator chassis is in the fully raised position.

The lift members and transfer members move in unison whereby those work carriages supported in the raised position are advanced in continuous supported relationship whereby the workpieces suspended therefrom are transferred above partitions separating adjoining treating receptacles or work stations. The transfer members are disposed at substantially equally spaced intervals along the transfer mechanism, whereby the transfer force exerted is distributed substantially uniformly along the chain or element interconnecting the work carriers. In addition, the transfer member engages the engaging member on a work carrier in a manner so as to apply a substantially linear force thereto in the direction of travel of the work carriers without imposing any twisting forces avoiding thereby the imposition of undue stresses and friction loading on the operating components.

Still further advantages and benefits of the present invention will become apparent upon a reading of the description of the preferred embodiments, taken in conjunction with the accompanying drawings.

BRIEF DESCRIPTION OF THE DRAWINGS

FIG. 1 is a schematic plan view of a typical machine layout showing the position of the various treating stations therearound;

FIG. 2 is a transverse vertical sectional view taken through a machine of the type shown in FIG. 1;

FIG. 3 is a magnified fragmentary side elevational view, partly in section, of the upper end of a work carrier and the elevator chassis disposed adjacent thereto;

FIG. 4 is a transverse vertical sectional view of the engaging member and supporting member on the work carrier shown in FIG. 3, and taken substantially along the line 4—4 thereof;

FIG. 5 is an enlarged fragmentary side elevational view, partly in section, of an engaging member and a transfer member with a supporting member and carriage shown in phantom;

FIG. 6 is a transverse vertical sectional view through the engaging member shown in FIG. 5 and taken substantially along the line 6—6 thereof;

FIG. 7 is a fragmentary plan view of the transfer member on the elevator chassis engaging the engageable member on a work carrier in accordance with the arrangement shown in FIGS. 5 and 6;

FIG. 8 is a fragmentary side elevational view, partly in section, showing the chassis and a carriage on a work carrier disposed in the fully lowered position;

FIG. 9 is a front elevational view of an engaging member and transfer member in accordance with an alternative satisfactory embodiment of this invention;

FIG. 10 is a fragmentary side elevational view, partly in section, of the engaging member and transfer member shown in FIG. 9; and FIG. 11 is a fragmentary plan view of the engaging member and transfer member arrangement shown in FIGS. 9 and 10.

DESCRIPTION OF THE PREFERRED EMBODIMENTS

Referring now in detail to the drawings, a typical arrangement of a plurality of treating stations around a conveying machine of the type to which the present invention is applicable is schematically illustrated in FIG. 1. In the specific arrangement shown, workpieces are loaded on the work supporting members of the work carriers at a load station, indicated at L, and thereafter are transferred in a counterclockwise direction through an aligned row of treating receptacles comprising stations S1–S35, through arcuate end turnaround stations S36–S38, through a second aligned series of treating receptacles comprising stations S39–S73 along the opposite side of the machine, through a single station treating receptacle comprising station S74 and, finally, are unloaded at an unload station, indicated at U, disposed ajdacent to the load station L. In accordance with this arrangment, the work carriers and the workpieces supported thereon are conveyed in a closed circuit which has been categorized as being of the so-called return type, whereby the load and unload stations are disposed adjacent to each other.

As will be further observed in FIG. 1, some of the treating receptacles or tanks, such as the tanks indicated at 10, comprise multiple-station tanks into which the work supporting arms are lowered at the first station and are transferred while remaining in the fully lowered position until the last station of that tank, at which time they are again raised in order that they can be transferred without interference above the partitions separating the next adjoining treating receptacle. a plurality of single station receptacles 12 are also included in which a single short duration treatment is performed on the workpieces. The workpieces are lowered into the single station tanks and remain there for a preselected down dwell period as controlled by a suitable timer, whereafter the work supporting member and the workpieces thereon are withdrawn and transferred to the next adjoining treating station.

The specific arrangement as shown in FIG. 1 encompasses seventy-four stations in addition to the load station L and unload station U, which are disposed at substantially equal longitudinally spaced intervals. An intermittent advancement of the work carriers and the work pieces thereon is achieved by a transfer mechanism which is schematically represented in FIG. 1 by two longitudinally extending slide plates 14 incorporating transfer assemblies 16 at selected locations therealong. In the specific arrangement shown in FIG. 1, a transfer assembly 16 is located at station S3 and is adapted to engage a work carrier with its work supporting arm in the lowered position in the first multiple-station tank 10 for effecting a transfer thereof to the next station adjacent thereto; a transfer assembly 16 is located at station S19 for engaging and transferring a work carrier with its work supporting member in a lowered station at the midpoint of the multiple-station tank 10 to the next adjoining treating station; a transfer assembly 16 is located at station S33 for engagement of a work carrier in the multiple-station tank 10 with its work supporting arm in the lowered position for transfer to the last station of that tank; a transfer assembly 16 is located at station S44 for engaging a work carrier with the work supporting member thereof in a raised position to enable the workpieces to be transferred above a partition 18 separating the multiple-station tanks 10; a transfer assembly 16 is located at station S56 for transferring a work carrier with its work supporting arm in the lowered position ot the next adjacent station of a multiple-station tank 10 and a transfer assembly 16 is located at station S69 for engaging a work carrier with it work supporting arm in the lowered position to the last station of the multiple-station tank 10. A corresponding advancing movement of the remaining work carriers is achieved in unison with the engaged work carriers by interconnecting means extending between and secured to work carriers in a manner as subsequently to be described.

Referring now to FIGS. 2–4 of the drawings, the conveying machine comprises a central framework comprised of a plurality of base beams 20 defining a platform on which a plurality of vertical cenral columns 22 are rigidly secured in longitudinally spaced relationship and which are interconnected along their upper ends by means of a longitudinally extending beam 24. A series of treating tanks or receptacles, such as the multiple-station tanks 10, are supported in the form of two aligned rows on the base beams 20 and into which tanks workpieces, indicated in phantom at 26, are adapted to be sequentially immersed.

Disposed inwardly of the two aligned rows of tanks 10 are a series of upright members 28 which are securely affixed at their lower ends to the base beams 20 and are interconnected along their upper ends by longitudinally extending beams 30. The beams 30 are interconnected at spaced intervals by cross members 32, forming therewith an elevated platform on which U-shaped lower guide member 34 is rigidly affixed. The lower guide member 34 includes two straight side sections which are interconnected at their ends by arcuate turnaround sections (not shown), providing a continuous closed circuit within which a lower roller chain 36 is guidably disposed.

An upper U-shaped guide member 38 is affixed to the underside of a plurality of spaced cross members 40 secured to the upper portions of columns 22 and similarly includes arcuate turnaround sections (not shown) forming a continuous closed circuit. The upper guide member 38 is disposed in vertical alignment above the lower guide member 34 and serves to guide a continuous upper roller chain 42 through a closed loop.

A plurality of work carriers 44 are guidably mounted on the guide members at spaced intervals. Each work carrier comprises a substantially upright carriage frame 46 which is of a generally rectangular tubular configuration on which a carriage 48 is slidably and guidably mounted for movement to and from a lowered position as shown in solid lines in FIGS. 2 and 8, and a raised position as shown in phantom in FIG. 2 and in solid lines in FIG. 3. Each carriage is provided with a laterally extending work supporting member or arm 50 from which the workpieces 26 are adapted to be suspended, such as by means of a hook 52.

The upper end of the carriage frame 46 is secured to a mounting plate 54, as best seen in FIG. 3, which is affixed at opposite ends thereof by means of bolts 56 to adjacent rollers 58 of the upper roller chain 42. In a similar manner, the lower end portion of each carriage frame 46 is affixed to a lower mounting plate 54 which, as best seen in FIGS. 2 and 8, is secured by bolts 56 to rollers 58 of the lower roller chain 36. In accordance with this arrangement, the carriage frames, as well as the carriages and work supporting arms thereon, are guidably supported in a substantially upright aligned position throughout their course of travel along the side and arcuate end portions of the machine.

The upper and lower roller chains can be guidably supported by the arcuate end portions of the upper and lower guide members or, alternatively, can be supported by idler sprockets, schematically indicated at 62 in FIG. 1, which are rotatably mounted at the arcuate center at each end of the machine in a manner as more fully described in aforementioned U.S. Pat. No. 3,504,812, the details of which are incorporated herein by reference. Inasmuch as the upper and lower roller chains are substantially inextensible, the work carriers 44 are maintained in substantially fixed longitudinally spaced relationship along the guide members and the advancement of one such work carrier by the transfer mechanism effects a corresponding advancement of the remaining work carriers in unison through the interconnection of the roller chains in a manner as previously described.

A movement of the work supporting arms 50 between a lowered position, as shown in solid lines in FIG. 2, and a raised position, as shown in phantom, is achieved by an elevator chassis 62 guidably mounted on the columns 22 and extending longitudinally for substantially the entire length of the machine and adjacent to the path of travel of the work carriers along the central framework. The elevator chassis 62, as best seen in FIGS. 2 and 3, is comprised of a pair of longitudinally extending channel members 64 having their upright web sections securely fastened to each other at locations intermediate of the columns 22. The elevator chassis is moved to and from a raised position and a lowered position by any one of a variety of mechanisms well known in the art, such as a lift chain suspension mechanism including a double-acting fluid-actuated lift cylinder as described in the aforementioned U.S. Pat. No. 3,504,812.

Slidably mounted against the outer face of the webs of the channel members 64 are the slide plates 14 which extend for substantially the entire length of the elevator chassis as illustrated in FIG. 1. Each slide plate 14, as best seen in FIG. 3, is disposed with the edges thereof in sliding engagement within slide blocks 66 affixed at spaced intervals to the upright web of the channel members 64. A section of the upright web is provided with an elongated slot, indicated at 68, through which a bracket 70 projects having its base securely affixed to the inner surface of the slide plate 14. The end of the bracket 70 is affixed to the rod end portion 72 of a double-acting fluid-actuated transfer cylinder 74 having its blank end affixed to the inner surface of the channel member 64. The stroke of the transfer cylinder 74 is appropriately controlled in length to correspond to the distance between the treating stations, effecting thereby an intermittent advancement of the work carriers from one station to the next adjacent station in response to the reciprocating movement of the slide members from a retracted position to an advanced position.

The reciprocating transfer movement of each of the slide plates 14 is transmitted to certain ones of the work carriers by the transfer assemblies 16 which are disposed in engaging relationship with an engaging member 76, as may be best seen in FIGS. 5–7. As shown, the engaging member 76 is comprised of a tubular member of a generally square-shaped cross section which is securely affixed to the upper end portion of each carriage frame 46 and projects rearwardly thereof toward the elevator chassis. Each transfer assembly 16 comprises a first arm 78 and a second arm 80, the latter being substantially shorter than the first, and both of which are of a tubular construction having a substantially square cross section. The first arm and the second arm of each transfer assembly is rigidly secured, such as by welding, to the outer face of the slide plate 14 in a manner to project substantially perpendicular therefrom outwardly toward the work carriers. Engaging cams 82, 84 are securely fastened to the ends of the first and second arms, respectively, and are provided with substantially vertical engaging faces 86, 88, respectively, which are adpated to bear against opposed side faces of the engaging member 76. The upper end portions of the first and second engaging cams 82, 84 are formed with outwardly inclined cam surfaces 90, 92 which are adapted to coact with the lower edge portions of an engaging member during the ascending movement of the elevator chassis, facilitating a vertical alignment between the side surfaces of the engaging member and the engaging faces 86, 88 of the engaging cams.

In accordance with the foregoing arrangement, during the final ascending movement of the elevator chassis toward the fully raised position, a coacting engagment occurs between the transfer assemblies and the engaging members 76 on those carriage frames disposed at stations S3, S19, S33, S44, S56 and S69 (FIG. 1) until the fully raised position is attained as typified by the relationship shown in FIG. 6. At the completion of the ascending movement of the elevator chassis, which may be appropriately signaled by an up-position chassis limit switch that is interlocked in the central control circuit of the machine, the transfer cylinder is actuated, effecting an advancing movement of the slide plates and the transfer assemblies thereon, whereby an advancing force is applied to those work carriers having the engaging members thereon disposed in transfer engagement with the transfer mechanism. The remaining work carriers are transferred in unison in response to the pulling action of the roller chains extending between and interconnected to the work carriers.

At the completion of the advancing movement, which also may be signaled by an appropriate forward position limit switch (not shown), the lift mechanism is again actuated, whereby the chassis commences its descending movement and the transfer assemblies move downwardly and out of engagement with the engaging members 76.

The foregoing transfer movement is operative to effect an advancement of all work carriers including those with their carriages and work supporting arms in the lowered position while disposed in the multiple-station tanks, as well as an advancement of those work carriers having their carriages in an elevated position in order that the workpieces suspended therefrom can be transferred above the partitions separating adjoining treating receptacles. A lifting of a work carriage to the raised position is achieved by a lift member 94, as best seen in FIGS. 3 and 4, which is affixed to the outer face of the slide plate 14 and projects outwardly toward the work carriers. The lift member 94 is also of a tubular substantially square cross sectional configuration. The lift members 94 are spaced along the slide plates 14 at each station at which a work supporting arm is to be elevated preparatory to the next transfer movement.

Each carriage is provided with a rearwardly extending support member 96, the inwardly projecting end of which is adapted to overlie and become disposed in lifting engagement with the lift member 94 during the ascending movement of the elevator chassis. In accordance with a preferred construction, an auxiliary track 98 is affixed to the lower outer edge of the elevator chassis, such as by means of cross members 100, as is best seen in FIGS. 3 and 4, and the track 98 extends longitudinally and parallel to the reciprocating path of travel of the slide plate 14. The auxiliary track 98 is effective to support the lift member 94 and the weight of a work carriage and workpieces supported thereby during the ascending and descending movement of the chassis, as well as during the longitudinal transfer movement of the carriage while disposed in the fully raised position. For this purpose, the lift member 94 is provided with a leg portion 102 having a supporting roller 104 rotatably mounted on the lower end thereof, which in turn is disposed in rolling bearing contact on the upper surface of the track 98.

In order to assure proper alignment between the lift member 94 and the support member 96, the end portion of the lift member is provided with a U-shaped member 106 having a pair of transversely spaced prongs 108 which are adapted to straddle the leading and trailing edges of the support member 96 as best seen in FIG. 4. The coaction of the prongs 108 with the edges of the suppoort member restricts relative longitudinal movement between the support member and the lift member beyond a prescribed increment, thereby assuring continual support of the carriage while in an elevated position. The prongs 108 normally do not engage the engaging member 76 on the carriage frame and the transfer of the work carrier is achieved in response to the pulling force applied thereto by the roller chains in response to the transfer movement of the transfer mechanism.

It is also contemplated in accordance with the practice of the present invention that a lift member 94, as shown in phantom in FIG. 6, can be provided on the slide plate 14 for engaging a support member 96 on a work carrier at that station and that a transfer assembly 16 can also be located on the slide plate at that same position for engaging the engaging member 76 at the upper end portion of the carriage frame. The general disposition of the engaging cams relative to the engaging member is shown in solid lines in FIG. 6, while the disposition of the lift member 94 and support member 96 are shown in phantom corresponding to the relative positions when the work carriage is in the fully raised position. In those instances in which a transfer assembly is located at a lift station, the U-shaped bracket 106 (FIG. 4) can be omitted, if desired, from the end of the lift member.

At the completion of the advancing movement of the transfer mechanism, the elevator chassis is energized and descends to the fully lowered position, as best seen in FIG. 8. In that position, the prongs 108 of the U-shaped member 106 on the lift member are disposed below and in clearance relationship with respect to the support member 96 projecting rearwardly of the carriage. Accordingly, an energization of the transfer cylinder 74 can be effected so as to retract the slide plate 14 from the advanced position to the fully retracted position preparatory to the next transfer movement. In this way, the various lift members on the slide plates are disposed below and in vertical alignment with the support members on the next series of work carriages to be lifted and the transfer assemblies are in vertical alignment with the engaging members on the carriage frames at stations S3, S19, S33, S44, S56 and S69.

An alternative satisfactory embodiment of the present invention is illustrated in FIGS. 9–11 which is similar to that previously described and like components are designated by like numerals with a prime affixed thereto. As shown, a transfer assembly 16' similar to the transfer assembly 16 is mounted on a slide plate 14' and comprises a first arm 78' and a second shorter arm 80', to the ends of which engaging cams 82' and 84', respectively, are secured. The engaging cam 82' has an engaging face 86' and a cam surface 90' while the engaging cam 84' is formed with an engaging face 88' and a cam surface 92' for the same purposes as previously described in connection with the transfer assembly 16. In lieu of an engaging member 76 affixed to the upper end of a carriage frame, such as shown in FIG. 7, the work carrier 44' is constructed such that its upper mounting plate 54' extends rearwardly beyond the carriage frame 46' to a position where the side edges thereof are engageable by the engaging faces 86', 88' of the transfer assembly. In accordance with this arrangement, the transfer force is applied directly to the upper roller chain 42' to which the upper mounting plate is affixed by means of bolts 56' in a manner as previously described. The arrangement shown in FIGS. 9–11 provides for increased accuracy in locating the engaging member relative to the transfer mechanism, providing for an improved efficiency and smoothness in engagement and disengagement thereof.

While it will be apparent that the invention herein disclosed is well calculated to achieve the benefits and advantages hereinabove set forth, it will be appreciated that the invention is susceptible to modification, variation and change without departing from the spirit thereof.

What is claimed is:

1. A conveying machine comprising a framework, guide means extending longitudinally of said framework, a plurality of work carriers each including an upright carriage frame movably mounted on said guide means and a carriage having a work supporting member thereon guidably mounted on said carriage frame for movement between a raised position and a lowered position, interconnecting means for maintaining said work carriers in longitudinally spaced intervals along said guide means, an elevator chassis movably mounted on said framework, means for moving said chassis to and from said raised position and said lowered position, longitudinally reciprocable transfer means on said chassis movable from a retracted position to an advanced position when said chassis is in said raised position, an engaging member affixed to the upper end portion of each said carriage frame and projecting laterally thereof toward said elevator chassis, a transfer member on said transfer means engageable with said engaging member at spaced locations along the length thereof for transmitting a transfer force thereto in a longitudinal direction without imposing a rotative couple on said carriage frame for advancing said work carriers in response to the advancing movement of said transfer means, supporting means on each said carriage, and lift means on said chassis longitudinally reciprocable in unison with said transfer means for engaging said supporting means on selected ones of said carriages to effect up and down movement thereof in response to movement of said chassis to and from said raised and said lowered position.

2. The conveying machine as defined in claim 1, in which a plurality of transfer members are incorporated on said transfer means at substantially equally spaced intervals therealong for distributing the transfer force exerted by said transfer means substantially uniformly along said interconnecting means.

3. The conveying machine as defined in claim 1, wherein said engaging member and said transfer member are engageable and disengageable in response to the final movement of said chassis toward and the initial movement of said chassis away respectively from said raised position.

4. The conveying machine as defined in claim 1, wherein said guide means defines a closed path of travel for said work carriers for intermittent movement in the same direction through a series of work stations.

5. The conveying machine as defined in claim 1, wherein said transfer member is disposed in vertically spaced clearance relationship from said engaging member and from said supporting means when said chassis is in said lowered position and said transfer means are moved from said advanced to said retracted position while in said lowered position.

6. The conveying machine as defined in claim 1, wherein said interconnecting means comprises a roller chain guidably supported by said guide means and operable to transmit the advancing force applied to one said work carrier to the other said work carriers effecting uniform movement thereof at fixed spaced intervals.

7. The conveying machine as defined in claim 1, wherein said transfer means comprises a slide member slidably mounted on said chassis and extending longitudinally thereof, and said transfer member and said lift means are mounted on and reciprocable with said slide member.

8. The conveying machine as defined in claim 1, wherein each said carriage frame includes a mounting member affixed to the upper end thereof to which said interconnecting means are secured for maintaining said work carriers in fixed longitudinally spaced intervals, said interconnecting means guidably disposed in said guide means, said mounting member formed with an extended portion projecting rearwardly of said frame toward said elevator chassis for engagement with said transfer member in a manner to apply a substantially longitudinal transfer force to said carriage frame.

9. The conveying machine as defined in claim 3, wherein said transfer member and said engaging member include coacting means thereon for facilitating an engaging alignment therebetween during the ascending movement of said elevator chassis.

10. The conveying machine as defined in claim 7, further including a supporting track on said chassis extending longitudinally of the reciprocating path of travel of said lift means for movably supporting said lift means and a carriage engaged thereby during the reciprocating movement thereof.

11. The conveying machine as defined in claim 1, wherein said lift means and said supporting means include interlocking means for restricting relative longitudinal movement therebetween beyond a predetermined distance while said supporting means is disposed in supported relationship with said lift means.

* * * * *